US005959640A

United States Patent [19]

Rudin et al.

[11] Patent Number: 5,959,640

[45] Date of Patent: Sep. 28, 1999

[54] DISPLAY CONTROLLERS

[75] Inventors: John Christopher Rudin, Bristol; Andrew Peter Aitken, Winterbourne, both of United Kingdom

[73] Assignee: Hewlett-Packard Company, Palo Alto, Calif.

[21] Appl. No.: 08/782,847

[22] Filed: Jan. 13, 1997

[51] Int. Cl.[6] ........ G06F 13/16

[52] U.S. Cl. ........ 345/521; 345/515; 345/3; 345/98; 711/151; 711/157; 711/158

[58] Field of Search ........ 345/515, 3, 98, 345/127, 521, 520, 510, 508, 27, 213; 711/120, 100, 151, 173, 158, 157

[56] References Cited

U.S. PATENT DOCUMENTS

| | | | |
|---|---|---|---|
| 4,511,965 | 4/1985 | Rajaram | 345/27 |
| 4,815,033 | 3/1989 | Harris | 345/199 |
| 4,858,107 | 8/1989 | Fedele | 711/158 |
| 5,001,652 | 3/1991 | Thompson | 345/520 |
| 5,335,322 | 8/1994 | Mattison | 345/511 |
| 5,450,542 | 9/1995 | Lehman et al. | 345/512 |
| 5,563,623 | 10/1996 | Barrett, Jr. | 345/98 |

FOREIGN PATENT DOCUMENTS

| | | |
|---|---|---|
| 0 182 454 | 5/1986 | European Pat. Off. . |
| 0 228 135 | 7/1987 | European Pat. Off. . |
| 0 546 780 | 6/1993 | European Pat. Off. . |
| 2 677 158 | 12/1992 | France . |

OTHER PUBLICATIONS

European Search Report, Application No. EP 96 30 0452, dated Jul. 9, 1996 by Examiner L. Farricella, 2 pages.

*Primary Examiner*—Kee M. Tung
*Assistant Examiner*—Sy D. Luu

[57] ABSTRACT

An LCD panel controller includes a panel display driver driving a display panel having an inherent line input buffer, a memory/interface block, a frame memory and a host computer. The memory interface block implements a non-uniform asynchronous transfer protocol for memory access and arbitration between requests for memory access by the display driver and one or more other interfaces shown in the memory/interface block. The nonuniform or asynchronous transfer provides a good level of memory access to other memory users, without requiring significant amounts of additional memory or significantly faster memory.

12 Claims, 3 Drawing Sheets

DISPLAY CONTROLLERS

FIELD OF THE INVENTION

This invention relates to display controllers for controlling displays which are capable of storing one or more lines of data, and to systems incorporating said controllers. In particular, but not exclusively, this invention relates to display controllers for controlling LCD panel displays.

BACKGROUND OF THE INVENTION

Conventional LCD panel drivers have in the past been derived from controllers designed for cathode ray tubes (CRTs), which are designed to provide a constant pixel output and which thus require a uniform data transfer. Consequently these have been synchronous devices requiring permanent clocks and fast memory access. With more complex displays requiring higher bandwidth, an increasing proportion of the gate count becomes dedicated to generating the clock signals and maintaining stability of the clock signal throughout the circuit. This contributes significantly to the power consumption of the display system. Also, most CRT controllers and the LCD drivers derived therefrom are built with backwards compatibility so that the display can handle earlier graphics adapters, and this means that, whilst a significant proportion of the logic is not actually used in most applications, this still contributes to the gate count. The synchronous operation also places rigid constraints on the timing of memory access and may necessitate the use of fast and expensive memory such as VRAM if the host or other memory interfaces require rapid memory access, or if there are increased numbers of other interfaces, such as a pen interface, an image decompression unit, a video source, another host or another display. There exist computer graphics systems which attempt to provide greater flexibility and access by the host by providing a frame or half-frame buffer, often referred to as a "frame accelerator", which receives data from the device memory before it is sent to the display, and which acts as a buffer between host accesses and the display access. However, these systems require additional memory which increases their cost. EP-A-0228135 describes an arrangement for programmable sharing of display memory between a CRT display and one or more other resources. In this arrangement, the data transfer is essentially synchronous and, in certain modes, display process and update accesses to the memory may be interleaved under software control.

As portable computing appliances become more widespread, there is a growing need for low power consumption display controllers which can use a moderate speed memory whilst providing a good level of memory access to other memory users, and which can be manufactured relatively economically, without requiring significant amounts of additional memory.

SUMMARY OF THE INVENTION

We have realised that many non-CRT displays have an inherent line storage ability prior to display, (for example, a data register within the LCD column driver devices), and that this fact can be used to advantage because it allows re-synchronisation of data transfer to different clocks. For example in twisted nematic (TN) or supertwist nematic (STN) LCDs, the optical effect works on the RMS average of the voltages seen during a time frame. Serially accessed line registers build up a store of data during the previous line time, and non-uniformity in the data transfer is acceptable. Variation in the line synchronisation time manifests as optical differences in the LCD; most LCDs of this type can tolerate up to 5% variation in line synchronisation time with "one off" variations of typically 50–100%.

In active matrix LCDs (AMLCD) the liquid crystal is driven on the voltage applied. The line access time is relatively unimportant and thus non-uniformities both within the line and also between lines can be tolerated. A minimum line access time must be allowed, for the pixel drive voltage to stabilise, but the frame rate can be altered by typically 50–100% without significant optical interference.

In bistable technologies the voltage holding ratio of the material may be seen as infinite and so non-uniform data transfer can be tolerated.

The invention thus applies broadly to non-CRT displays which have an inherent or associated register or storage facility, including the technologies referred to above, as well as many others, such as "On Silicon" technologies, for example LC over silicon, digital micromirrors, poly-Si light valves, etc.

Thus, in such displays, an asynchronous arbitration and memory access protocol may allocate the memory access effectively between the display and other memory users. On this basis, we have developed a display controller for non-CRT displays which provides effective access to the memory by the display and one or more other users, and which may be implemented with low speed, low cost, volume memory. The controller may have a substantially reduced gate count compared to circuits derived from CRT displays, and a consequently reduced current consumption.

Accordingly, in one aspect, this invention provides a display controller for a display system comprising:

a memory means for storing data to be displayed, a display means having associated therewith means capable of storing one or more lines or parts thereof of data to be displayed, one or more other interface means requiring access to said memory means, memory access control means for arbitrating between competing requests for memory access by said display means and one or more of the other interface means to interleave memory accesses by said display means and said one or more other interface means, and operable in use to effect non-uniform or asynchronous data transfer from said memory means to said display means.

By using non-uniform or asynchronous data transfer many of the constraints on timing imposed by synchronous operation are removed, allowing a flexible and optimised memory access by the display and other memory users, minimising the impact on the performance and design constraints of the display or the other memory interfaces.

As compared with EP-A-0228135, embodiments of a display controller in accordance with this invention allow interleaving to be driven by competing requests for memory access rather than by software control. This means that the controller is far more flexible and allows "dynamic" interleaving, that is interleaving only when required by the competing requests.

The non-uniform data transfer may be effected synchronously if the clock speed is high enough. The buffer means may form part of the display means or part of the controller.

The memory access control means preferably implements a prioritisation technique in which it determines the relative priority of requests for memory access, and arbitrates between said requests on the basis of said priority. In the event of competing requests for memory access, the memory access control means preferably provides interleaved access to said memory means by said display means and one or more other interface means throughout at least a substantial proportion of the line period of said display means. The interleave ratio may be fixed or variable. Thus where a variable interleave ratio is implemented, the ratio may be set by determining, during each line period, the proportion of the current line of data that has been accessed, and adjusting the interleave ratio in accordance with the proportion of the current line of data still to be accessed.

Whilst various forms of non-uniform or non-synchronous transfer may be employed, it is preferred for the memory access control means to use an asynchronous handshake in response to a request for memory access by said means or a request for memory access by said other interface means.

The invention also extends in other aspects to display systems incorporating the display controller described above, and to methods of controlling memory access and data transfer as implemented in the above apparatus.

Thus, in a further aspect, this invention provides a display system comprising:

a memory means for storing data to be displayed;

a display means capable of storing one or more lines or parts thereof of data to be displayed, and requiring access to said memory means;

one or more interface means also requiring access to said memory means, and memory access control means for arbitrating between competing requests for memory access by said display means and said other interface means to interleave memory accesses by said display means and said one or more other interface means, and operable in use to effect non-uniform or asynchronous data transfer from said memory means to said display means.

Said display means preferably comprises a liquid crystal display. In a typical arrangement, said display means includes line or column drive means for applying to said display means line or column drive data, and further includes shift register means for storing said one or more lines or parts thereof prior to transfer to said line or column drive means.

In one arrangement, said memory access control means is operable to apply a fixed interleave ratio of accesses by said display means and said one or more interface means to said memory means in response to competing requests for memory access from said display means and said one or more interface means.

In another arrangement said memory access control means is operable to apply a variable interleave ratio of accesses by said display means and said one or more interface means to said memory means, which is dependent in a given line period on the proportion of the current line of data still to be transferred to said display means.

The memory access means may also be operable in a given line period to provide one or more of said other interface means with limited period priority access to said memory means, provided the resultant balance of the line period is sufficient to allow substantially the whole of the line of display data to be accessed within said line period.

Whilst the invention has been described above, it extends to any inventive combination of features set out above or in the following description.

BRIEF DESCRIPTION OF THE DRAWINGS

The invention may be performed in various ways and, by way of example only, an embodiment thereof will now be described in detail, reference being made to the accompanying drawings in which.

Figure 1:
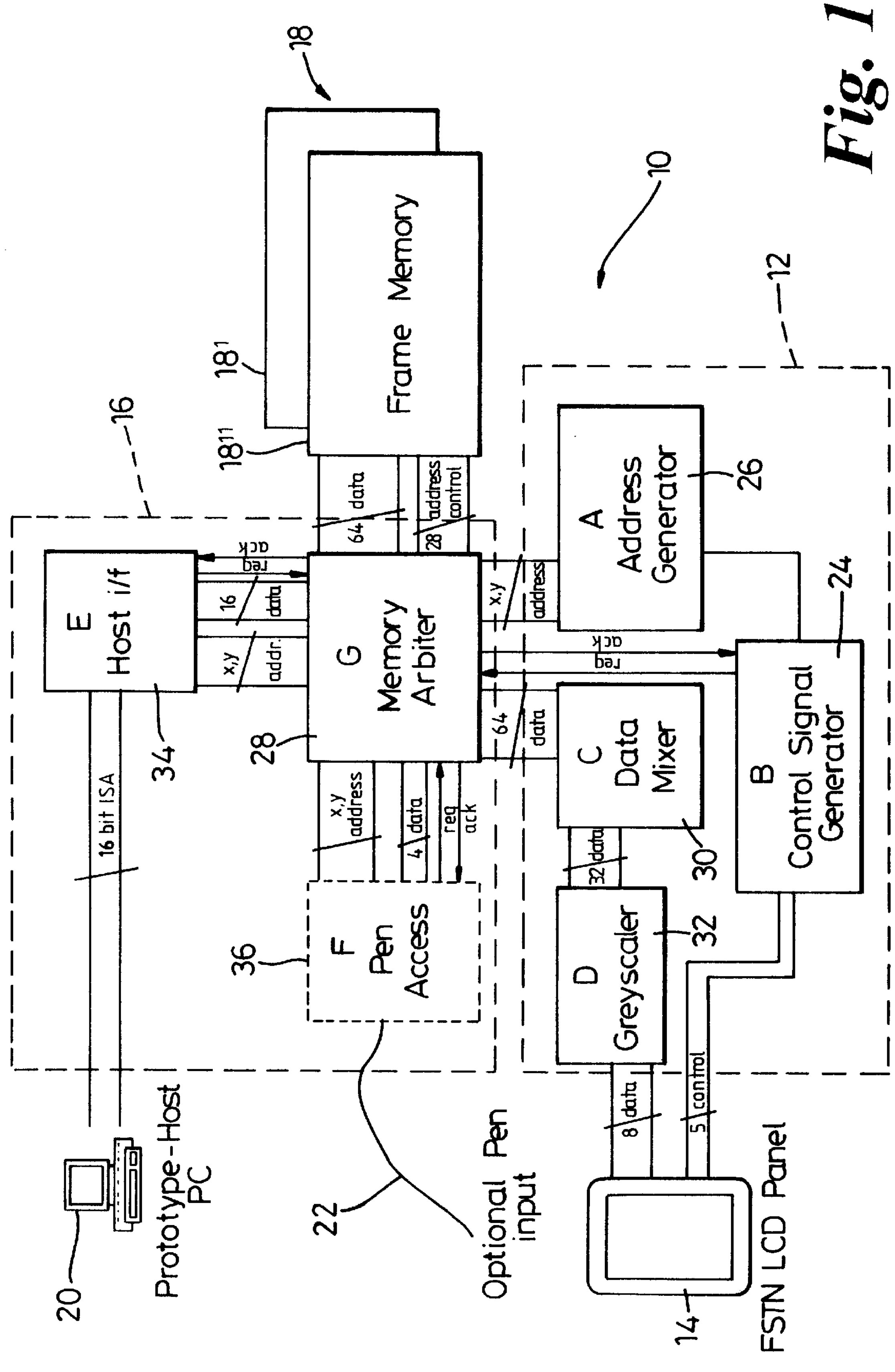
FIG. 1 is a block diagram of an embodiment of an LCD panel controller in accordance with this invention.

The LCD panel controller 10 comprises a display driver 12 driving a display panel 14, a memory/interface block 16, a frame memory 18 and a host computer 20. The memory interface block 16 implements an asynchronous transfer protocol for memory access and arbitration between requests for memory access by the display driver 12 and one or more other interfaces shown in the memory/interface block 16. In this example, the LCD panel 14 has a line input buffer which stores a line of data before displaying it. The display may receive the data in a single block or several smaller blocks, provided the full line of data is in the buffer by the end of the line period, when it is clocked into the display electrodes by the line sync pulse.

Figure 2:
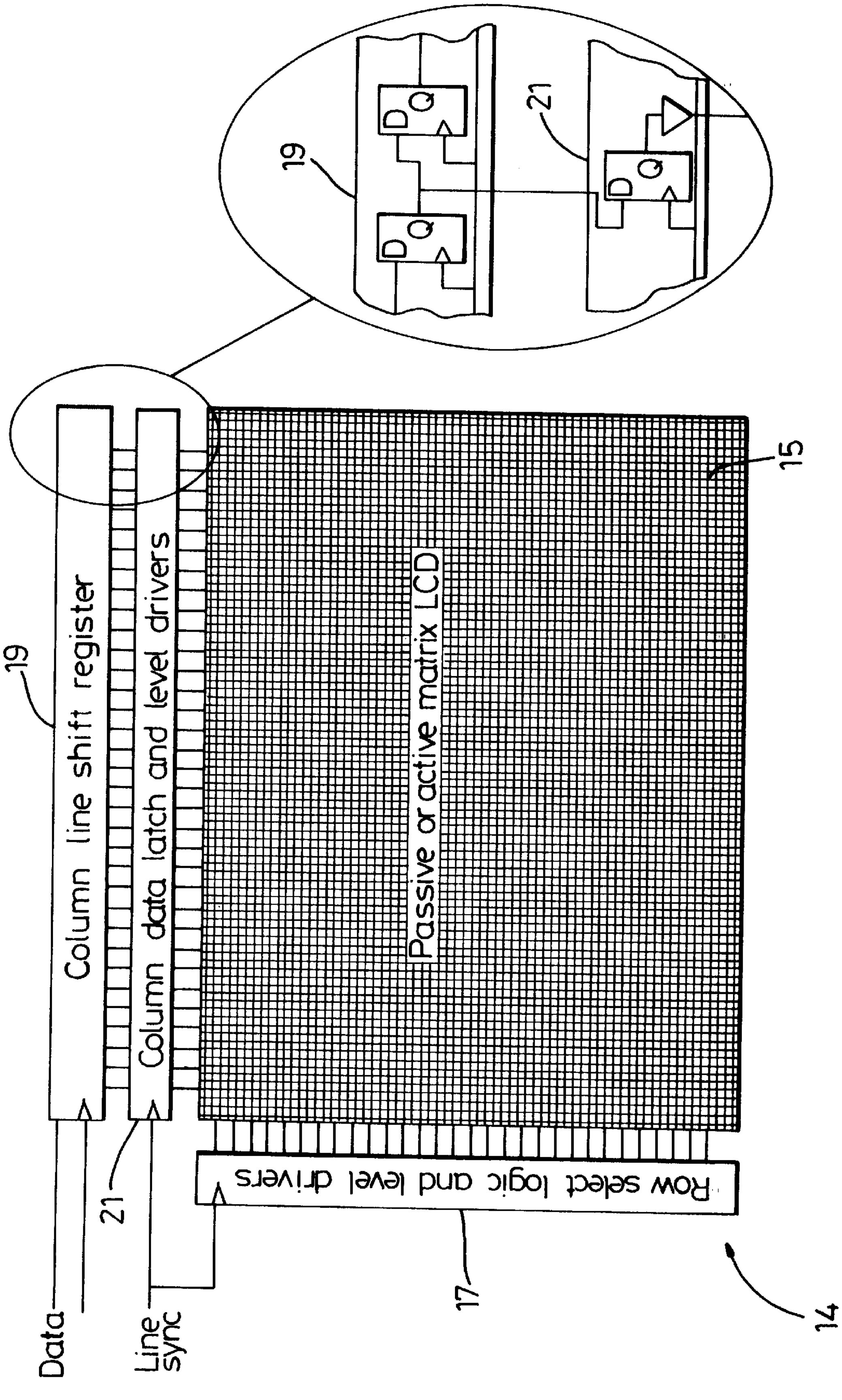
FIG. 2 is a schematic diagram illustrating the internal structure of a typical LCD panel.

Referring to FIG. 2, a conventional LCD display panel 14 which typically comprises an LCD element 15 with row select logic and level drivers 17, a column line shift register 19 and column data latch and level drivers 21. The row drivers 17 are simpler and step a select voltage level down the rows of the element 15, effectively selecting a single row at a time, on each line sync pulse. The column drivers 21 hold the column drive data on the level drivers for a whole line period by latching the data once it has been shifted into the shift register 19 above. Once the data has been latched across by the line sync pulse, the next line of data can be shifted into the register. Thus the display panel 14 has an inherent line storage facility in the form of the shift register 19 and, within certain limits, the shift register can accept data for the next line to be displayed at any point within the preceding line period.

In this example of LCD panel controller, which has a pen input device 22, the frame memory 18 is augmented by an inking plane 18$^{1}$ to minimise the need to manipulate data. In this way, a page of text annotated with manuscript notes via the pen input device requires only the inking plane 18$^{1}$ to be modified to include the manuscript notes.

The display driver 12 comprises a control signal generator 24 which provides the correct clock and synchronisation signals to the display panel 14 and increments an address generator 26 after each transfer from memory. The control signal generator 24 also initiates requests for data from the frame memory 18 via a memory arbiter 28, using an asynchronous request-acknowledge protocol as to be described below. In response to such requests, data is transferred from the frame memory 18 via the memory arbiter 28 to a data mixer 30 which combines data from the frame memory 18 and the inking plane 18$^{1}$, into a single data word corresponding to the output value of the particular pixel to be displayed. The output from the data mixer 30 is passed to a greyscale generator 32 which generates a spatio-temporal dither where the LCD panel 14 does not have an inherent greyscale capability. The output from the greyscale generator 32 is a binary data bit corresponding to the drive of each pixel. This is then supplied to the LCD panel 14 where it is stored temporarily in the column line shift register 19 until the line of data is complete and the control signal generator outputs a line sync pulse to cause the new line of pixels to be displayed. The memory/interface block 16 also includes two further interfaces, namely a host interface 34 connected to the host computer 20, and a pen access 36. The host interface 34 allows the host 20 to read or write from one to four pixels of data into the frame memory/inking plane 18,18[1]. The host interface 34 maps an arbitrary (x,y) address to the physical memory address and also maps the data position within the sixty-four bit word. The pen access 36 provides a single pixel write access to the inking plane 181 given a (x,y) pointer. Both the host interface 34 and the pen access 36 may initiate data requests from the memory arbiter 28 using an asynchronous request-acknowledge protocol.

This particular example stores data in the memory and operates on a "dual scan" basis, where data for two rows, separated by half the display screen, is clocked simultaneously into the upper and lower column drivers of the display panel 14. For ease of installation only one set of column drivers is shown in FIG. 2. The data is stored in the frame memory/inking plane 18, 18[1], in an interleaved form. The database between the frame memory 18 and the memory arbiter 28 is sixty-four bits wide with thirty-two bits for the upper screen and thirty-two bits for the lower screen at each address. Within each thirty-two bit word, data for four pixels is stored, with four bits for the frame memory 18 plane, and four bits for the inking plane 18[1]. Although in this example the frame data is actually interleaved, the hardware address mapping described makes it appear as a continuous two-dimensional plane to the remaining interfaces.

In operation, the memory arbiter 28 provides an asynchronous bus control using a two-line four-phase asynchronous request-acknowledge protocol for the display driver 12, the host interface 34 and the pen access 36.

In the event of competing requests for memory access from two or more of the control signal generator 24, the host interface 34 and the pen access 36, the arbiter 28 arbitrates and ensures that for each line period, the display driver has access to the memory for sufficient memory cycles to make up the line of data. This may be achieved in two ways, either by implementing a fixed interleave ratio between the display memory accesses and non-display memory accesses in response to competing requests. Alternatively this may be achieved by implementing a variable interleave ratio which may be modified through each line period in accordance with the proportion of the line of data sent to the display.

In the first arrangement, the interleave ratio is selected taking into account the timing of the line period and the memory access cycles to ensure that, in the worst case, where there is a constant demand for memory access from the other memory users, the display driver 12 is allowed sufficient memory access cycles during each line period to make up a complete line of data for the display. Thus, in this example the arbiter might typically provide 2:1 interleaving for display:non-display memory access cycles, but a different fixed ratio could apply for other combinations and displays and memory.

In the variable or adaptive implementation, the arbiter 28 includes means which, during each line period, determines how much of each line of data to be set to the display has already been accessed and/or how much is still to come. The arbiter then modifies the interleave ratio which initially is set at a lower level than the fixed ratio referred to above. The proportion of the line of data is monitored and at stages through the line period, if it becomes apparent that there is still greater than a preset target proportion of the line left to access, the interleave ratio implemented by the arbiter is increased. Thus, for example, the arbiter 28 may initially apply a 1:1 ratio for display:non-display accesses at the beginning of each line period, and then increase this through the line period 2:1,3:1 etc., as the end of the line period approaches.

Figures 3A, 3B, 3C:
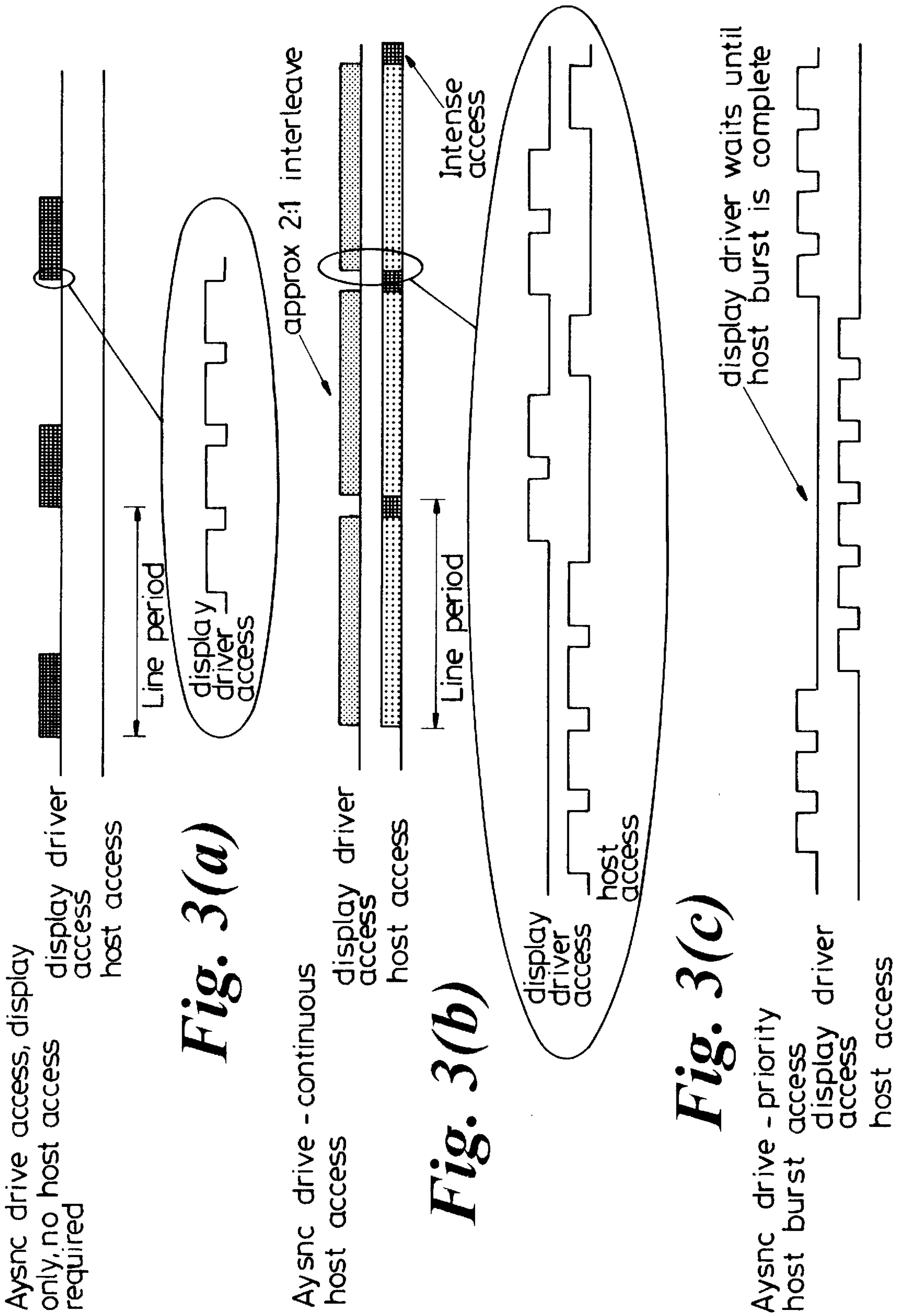
FIGS. 3(*a*) to 3(*c*) are waveforms illustrating the memory cycles of the display driver and the host for different conditions, for an embodiment of LCD panel controller implementing a fixed interleave ratio.

FIG. 3(*a*) shows the display driver access and host access for a normal fixed interleave ratio mode for a period in which no host access is required. Here the data for the LCD panel 14 is read as quickly as possible in consecutive memory accesses and fed in a burst into the panel shift register during the first portion of each line period, with the controller idling for the rest of the line period, thereby reducing quiescent current consumption.

FIG. 3(*b*) shows the worst case, where the host requires continuous access to the memory in an arrangement with a fixed 2:1 interleaving ratio. Here the controller provides 2:1 interleaving for most of the line period with a short burst of continuous access for the host at the end of each line period, when the input buffer/shift register of the LCD panel is already full.

It will be appreciated that the interleaving is driven by the competing memory requests and this ensures that the interleaving is applied only when required, thus providing a flexible and dynamic interleaving scheme. When there are no longer any competing requests, the arbiter 28 allows substantially immediate access to any interface requesting access and this will continue until there is a competing request from another interface whereupon the arbiter will apply the relevant interleave ratio.

Finally, in FIG. 3(*c*) the memory arbiter implements a "priority burst access" mode in which it detects that the host requires only a small number of accesses (six in this example). The arbiter interrupts the control signal generator 20 and allows the host immediate access. We have found that, even though this may mean that the complete line of display driver accesses take longer than the nominal line period, and thus disturb the line to line timing, no effect is seen, even with aberrations of up to +/− 20%, provided that the extended accesses are limited and occur randomly. In this last mode, the arbiter effectively prioritises requests for data access by the host and grants immediate access, provided this will leave sufficient time for substantially all of the remainder of the display line to be accessed within the remainder of the line period.

We claim:

1. A display controller for a display system comprising:

a memory means for storing data to be displayed, a display means having associated therewith means for storing one or more lines or parts thereof of data to be displayed, one or more other interface means requiring access to said memory means, memory access control means for arbitrating between competing requests for memory access by said display means and one or more of the other interface means to interleave memory accesses by said display means and said one or more other interface means, and operable in use to effect non-uniform or asynchronous data transfer from said memory means to said display means.

2. A display controller according to claim 1, wherein said memory access control means determines the relative priority of requests for memory access, and arbitrates between said requests on the basis of said priority.

3. A display controller according to claim 1, wherein said memory access control means is operable to provide a fixed interleave ratio between accesses by said display means and accesses by said one or more interface means, in response to competing requests for memory access by said display means and said one or more other interface means.

4. A display controller according to claim 1, wherein said memory access control means is operable to provide a variable interleave ratio between accesses by said display means and accesses by said one or more interface means, in response to competing requests for memory access by said display means and said one or more other interface means.

5. A display controller according to claim 4, wherein said memory access control means includes means for determining, during each line period, a proportion of a current line of data that has been accessed for transfer to said display means, and means for adjusting an interleave ratio in accordance with the proportion of said current line of data still to be accessed.

6. A display controller according to claim 1, wherein said memory access control means uses an asynchronous handshake in response to a request for memory access by said display means or a request for memory access by said other interface means.

7. A display system comprising:

a memory means for storing data to be displayed;

a display means for storing one or more lines or parts thereof of data to be displayed, and requiring access to said memory means;

one or more interface means also requiring access to said memory means, and memory access control means for arbitrating between competing requests for memory access by said display means and said other interface means to interleave memory accesses by said display means and said one or more other interface means, and operable in use to effect non-uniform or asynchronous data transfer from said memory means to said display means.

8. A display system according to claim 7, wherein said display means comprises a liquid crystal display.

9. A display system according to claim 7, wherein said display means includes line or column drive means for applying to said display means line or column drive data, and further includes shift register means for storing said one or more lines or parts thereof prior to transfer to said line or column drive means.

10. A display system according to claim 7, wherein said memory access control means is operable to apply a fixed interleave ratio of accesses by said display means and said one or more interface means to said memory means in response to competing requests for memory access from said display means and said one or more interface means.

11. A display system according to claim 7, wherein said memory access control means is operable to apply a variable interleave ratio of accesses by said display means and said one or more interface means to said memory means which is dependent in a given line period on the proportion of the current line of data still to be transferred to said display means.

12. A display system according to claim 7, wherein said memory access means is also operable in a given line period to provide one or more of said other interface means with limited period priority access to said memory means, provided a resultant balance of the line period is sufficient to allow substantially a whole of a line of display data to be accessed within said line period.

* * * * *